(12) United States Patent
Murata et al.

(10) Patent No.: US 11,112,170 B2
(45) Date of Patent: Sep. 7, 2021

(54) REFRIGERATOR

(71) Applicant: Samsung Electronics Co., Ltd, Suwon-si (KR)

(72) Inventors: Yasukiyo Murata, Kanagawa (JP); Morio Yoshimoto, Kanagawa (JP)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/083,478

(22) PCT Filed: Mar. 7, 2017

(86) PCT No.: PCT/KR2017/002429
§ 371 (c)(1),
(2) Date: Sep. 7, 2018

(87) PCT Pub. No.: WO2017/155269
PCT Pub. Date: Sep. 14, 2017

(65) Prior Publication Data
US 2019/0072322 A1    Mar. 7, 2019

(30) Foreign Application Priority Data

Mar. 7, 2016  (JP) .............................. JP2016-043393
Jun. 16, 2016 (JP) .............................. JP2016-119511

(51) Int. Cl.
*F25D 29/00* (2006.01)
*E05F 15/614* (2015.01)
(Continued)

(52) U.S. Cl.
CPC .......... *F25D 29/005* (2013.01); *E05F 15/614* (2015.01); *F25D 23/028* (2013.01);
(Continued)

(58) Field of Classification Search
CPC ...... F25D 29/005; F25D 23/028; F25D 29/00; F25D 2400/06; E05F 15/614; E05Y 2900/31
See application file for complete search history.

(56) References Cited

U.S. PATENT DOCUMENTS 9,285,162 B2    3/2016  Ryu et al.
2014/0293060 A1* 10/2014 Ryu .................... F25D 29/00
                                                      348/159
(Continued)

FOREIGN PATENT DOCUMENTS

EP    2784419 A1      10/2014
JP    2001-294308 A   10/2001
(Continued)

OTHER PUBLICATIONS

European Patent Office, "Supplementary European Search Report," Application No. 17763530.7, dated Jan. 31, 2019, 8 pages.
(Continued)

*Primary Examiner* — Thai Q Tran
*Assistant Examiner* — Jose M Mesa

(57) ABSTRACT

A door driving system and a refrigerator having the door driving system according to the present invention are provided with a motor, a power transmitting device for transmitting the power generated by the motor to the hinge, and an auxiliary device for receiving the power generated by the motor and generating an auxiliary force to move a door positioned in a closing position in an opening direction, so that the torque to be applied to the hinge of the door for opening and closing the door may be reduced.

14 Claims, 24 Drawing Sheets

(51) Int. Cl.
    *F25D 23/02*          (2006.01)
    *G06Q 10/08*         (2012.01)
    *H04N 5/225*         (2006.01)
    *H04N 5/232*         (2006.01)
    *H04N 7/18*           (2006.01)

(52) U.S. Cl.
    CPC ........... *F25D 29/00* (2013.01); *G06Q 10/087* (2013.01); *H04N 5/2252* (2013.01); *H04N 5/23222* (2013.01); *H04N 7/181* (2013.01); *E05Y 2201/434* (2013.01); *E05Y 2201/71* (2013.01); *E05Y 2400/30* (2013.01); *E05Y 2900/31* (2013.01); *F25D 2400/06* (2013.01); *F25D 2500/06* (2013.01); *F25D 2700/06* (2013.01)

(56) References Cited

U.S. PATENT DOCUMENTS

2015/0002660 A1    1/2015    Lee et al.
2016/0138860 A1*    5/2016    Kang ..................... F25D 29/00
                                                       62/130

FOREIGN PATENT DOCUMENTS

| | | | |
|---|---|---|---|
| JP | 2003-207258 A | | 7/2003 |
| JP | 2010230207 A | * | 10/2010 |
| JP | 2015014401 A | | 1/2015 |
| JP | 2015087041 A | | 5/2015 |
| JP | 2016-023892 A | | 2/2016 |
| KR | 10-2014-0120386 A | | 10/2014 |
| KR | 10-2015-0026412 A | | 3/2015 |

OTHER PUBLICATIONS

International Search Report dated Jun. 1, 2017 in connection with International Patent Application No. PCT/KR2017/002429.
Written Opinion of the International Searching Authority dated Jun. 1, 2017 in connection with International Patent Application No. PCT/KR2017/002429.
Communication pursuant to Article 94(3) EPC dated Jun. 28, 2016 in connection with European Patent Application No. 17 763 530.7, 7 pages.
Office Action dated May 25, 2021 in connection with Korean Patent Application No. 10-2018-7022341, 7 pages.

* cited by examiner

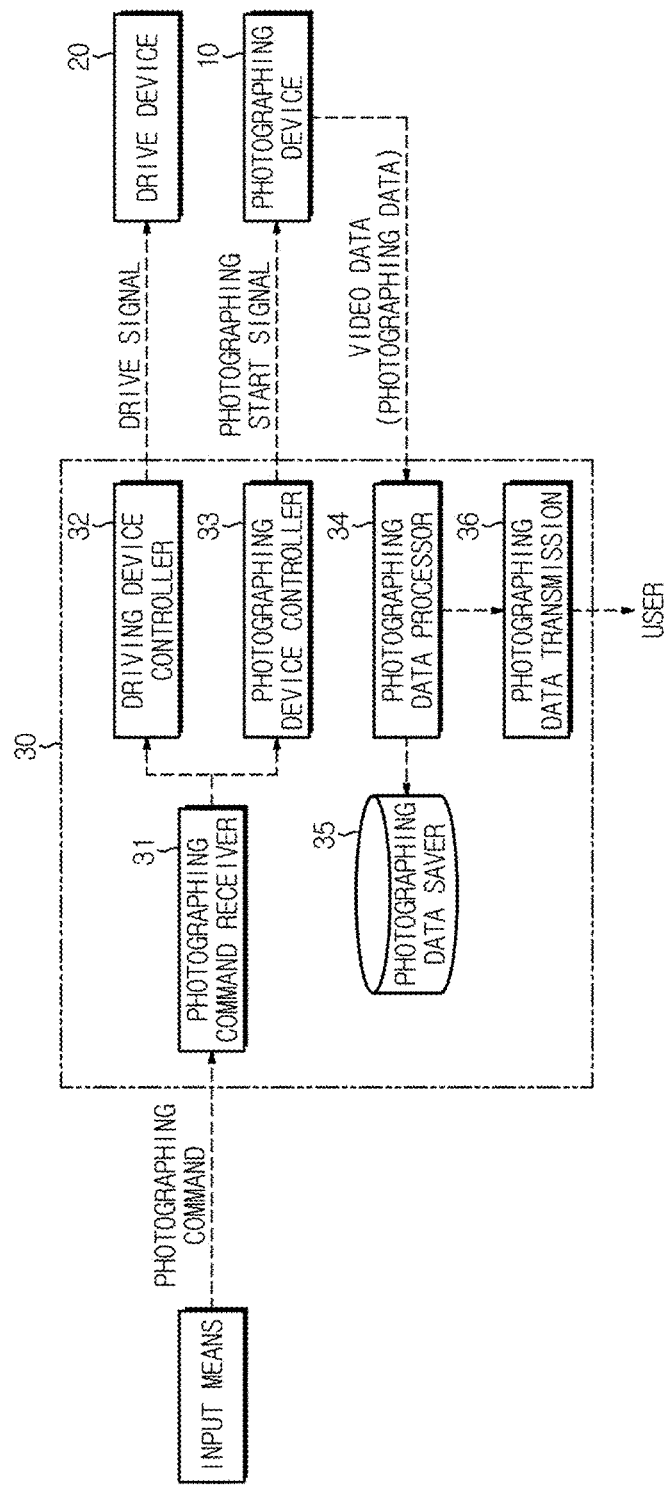

REFRIGERATOR

CROSS-REFERENCE TO RELATED APPLICATIONS

This application is a 371 of International Application No. PCT/KR2017/002429 filed on Mar. 7, 2017, which claims priority to Japanese Patent Application No. 2016-043393 filed on Mar. 7, 2016 and Japanese Patent Application No. 2016-119511 filed on Jun. 16, 2016, the disclosures of which are herein incorporated by reference in their entirety.

BACKGROUND

1. Field

The disclosure relates to a refrigerator having a door driving device used for opening and closing a door of the refrigerator and a camera.

2. Description of Related Art

In the conventional technology, there is a refrigerator having a photographing device for photographing the inside of the refrigerator such that the internal storage state of the refrigerator is confirmed even in a remote place.

More specifically, the photographing device is a camera installed inside a door of the refrigerator, and is configured to receive an instruction from the outside in a state where the door is closed and photograph the inside of the refrigerator.

However, in such a configuration, since the inside of the refrigerator is photographed while the door is closed, the distance between a stored object and the camera is relatively close when the stored object is placed at a front area inside the refrigerator such that there is a problem that the focus may not be properly adjusted and the camera may not photograph the stored object.

In addition, when photographing a storage pocket, the user needs to open both doors, so that when the user is away from the refrigerator, for example, when going out, the storage pocket may not be photographed and the storage state at that time may not be confirmed.

SUMMARY

It is an aspect of the disclosure to provide a refrigerator capable of taking a photograph of a stored object in the refrigerator clearly and photographing the stored object in a storage pocket even when the user is far away from the refrigerator.

In accordance with one aspect of the disclosure, a refrigerator includes a housing having a storage chamber, a door having the inside facing the storage chamber and opens and closes the storage chamber, a driving device for transmitting power to the door for automatically opening and closing the door, and a photographing device disposed in the door and photographing at least one of the storage chamber or the inside of the door when the door is opened by the driving device.

Also, the door includes a first door and a second door provided in a left-right direction with respect to the storage chamber, and the photographing device includes a first camera disposed on the first door and a second camera disposed on the second door, and the first camera photographs the inside of the second door when the second door is opened by the driving device.

Also, the door includes a first door and a second door provided in a left-right direction with respect to the storage chamber, and the photographing device includes a first camera disposed on the first door and a second camera disposed on the second door, and the first camera photographs the storage chamber when the first door is opened by the driving device.

Also, the door includes a first door and a second door provided in a left-right direction with respect to the storage chamber, and the photographing device includes a first camera disposed on the first door and a second camera disposed on the second door, and the first camera photographs at least one of the inside of the second door or the storage chamber when the first door and the second door are opened by the driving device.

Also, the driving device is provided to open the first door after opening the second door, and the first camera photographs the inside of the second door at a first position where the first door is opened and positioned by the driving device.

Also, the driving device is provided to dispose the first door at a second position located between a closed position where the first door closes the storage chamber and the first position, and the first camera photographs the storage room when the first door is positioned in the second position.

Also, the driving device is provided to dispose the second door at a third position in which the second door is opened, and the second camera photographs the inside of the first door when the second door is disposed in the third position and when the first door is disposed adjacent to the first position.

Also, the driving device is provided to dispose the second door at a fourth position located between the closed position where the second door closes the storage chamber and the third position, and the second camera photographs the storage room when the second door is placed in the fourth position.

Also, the refrigerator further includes an information processing device for receiving the photographed information from the photographing device, and the information processing device combines the photographed information which are information that photographed by the first camera where the first camera disposed in the first position and second position respectively, and that photographed by the second camera where the first camera disposed in the third position and fourth position respectively to form one image.

Also, the refrigerator further includes an information processing device for receiving the photographed information from the photographing device, and the information processing device selects optimal information corresponding to the inside of the storage chamber or the door among the information, and transmits at least one piece of information or the optimum information to the outside of the refrigerator.

Also, the information processing device includes a receiver for receiving an external signal, a driving device controller for controlling the driving device based on a signal input from the receiver, and a photographing device controller for controlling the photographing device based on the signal input from the receiver, and after the photographing device is driven at the first position, the driving device controller further opens or closes the door so that the photographing device is disposed at the second position by an external signal received by the receiver, and the photographing device controller drives the photographing device when the photographing device is disposed at the second position.

Also, the photographing device includes a first photographing device disposed on the door and a second photographing device disposed on the housing, and the second photographing device photographs the inside of the door when the door is opened by the driving device.

Also, the first photographing device photographs the storage chamber when the door is opened by the driving device.

Also, the refrigerator further includes a hinge that rotatably couples the door to the housing, and the door further includes a throat portion protruding outward from the inside of the door and a storage pocket mounted to the throat portion, and the photographing device is disposed on a side of the throat portion adjacent to the hinge.

Also, the refrigerator further includes a hinge that rotatably couples the door to the housing, and the door further includes a throat portion protruding outward from the inside of the door and a storage pocket mounted to the throat portion, and the first photographing device is disposed on a side of the throat portion adjacent to the hinge, and the second photographing device is disposed on an opposite side of the hinge.

In accordance with one aspect of the disclosure, it is possible to clearly capture the objects housed in the refrigerator or the storage pocket of the door, so that the housed state of the refrigerator may be confirmed even when the user goes out.

BRIEF DESCRIPTION OF THE DRAWINGS

FIG. 8 is a functional block diagram illustrating functions of an information processing device according to the first embodiment of the disclosure.

DETAILED DESCRIPTION

Hereinafter, an air cleaner according to one embodiment will be described in detail with reference to the drawings.

First Embodiment

Hereinafter, a first embodiment of a refrigerator according to the disclosure will be described with reference to the drawings.

Figure 1:
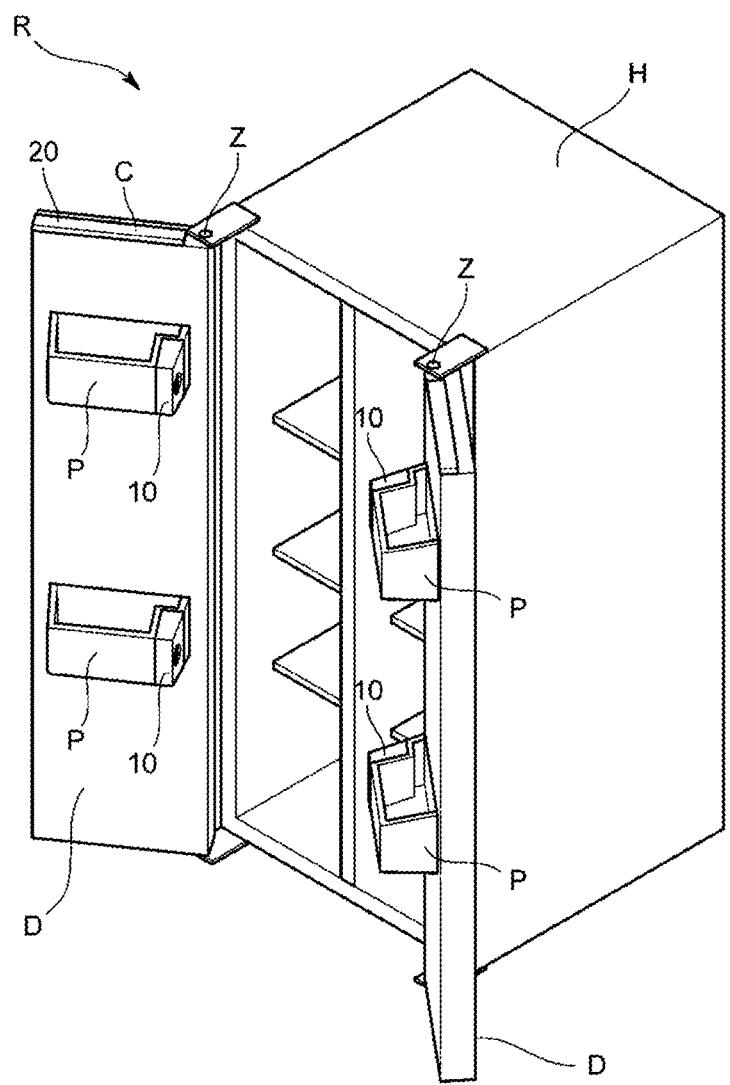
FIG. 1 is a view schematically illustrating a configuration of a refrigerator according to a first embodiment of the disclosure.

As shown in FIG. 1, a refrigerator R according to the disclosure includes a refrigerator main body H (hereinafter also referred to as a case H) having an open front side, having a pair of doors D installed on the open front side is a so-called two-door refrigerator each door D is rotatably supported on a hinge axis of a hinge Z.

As shown in FIG. 1, the refrigerator R is provided with a photographing device 10 installed inside the refrigerator on each of the right and left doors D and a door D provided at the upper portion of each of the right and left doors D, and provided with a driving device 20 for automatically opening and closing the door.

First, the photographing device 10 will be described.

Figure 2:
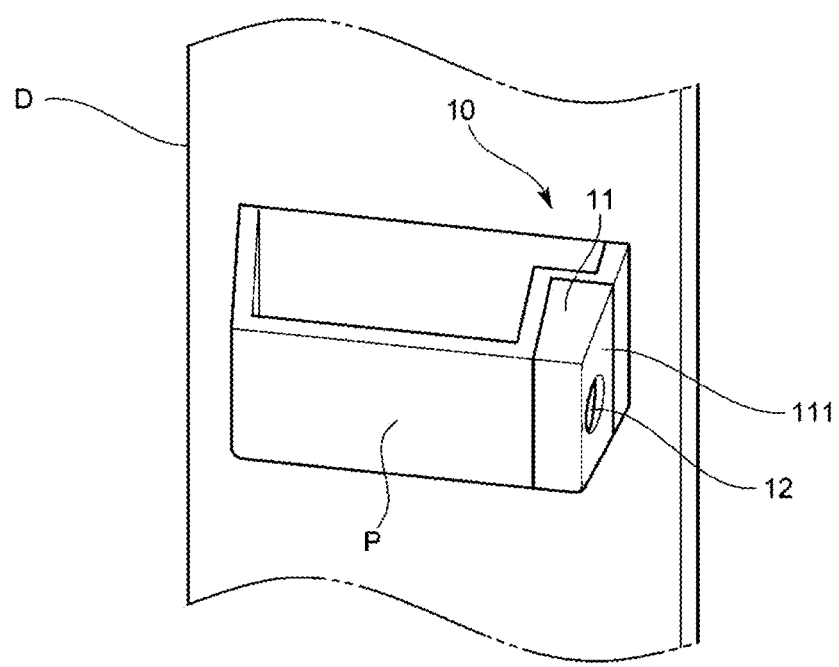
FIG. 2 is a view schematically illustrating a configuration of a photographing apparatus according the first embodiment of the disclosure.

As shown in FIG. 2, the photographing device 10 has a casing 11 and a camera body (not shown) housed in the casing 11. Here, a storage pocket P is provided in the door D is provided.

The refrigerator R of the present disclosure is provided with a plurality of the photographing devices 10 installed at different positions on the upper and lower sides and each of the photographing devices 10 is provided with a plurality of the storage pockets P. Further, the number of photographing devices 10 may be changed as appropriate.

As shown in FIG. 2, the casing 11 is a box-shaped casing provided on the side of the hinge Z of the storage pocket P, and has a surface 111 on the opposite side of the storage pocket P provided with a photographing window 12. The photographing window 12 is a window having transparency. A heater (a condensation preventing heater in the claims) is provided in the casing 11 so as to prevent the transparent window from being frosted. A heat insulating material is provided in the casing 11 so as to prevent the heat from the anti-fog heater from being transmitted to the storage pocket P.

The camera body is disposed in the casing 11 so as to take an image of the exterior of the casing 11 through the photographing window 12. Specifically, the camera body captures a moving image using a wide-angle lens.

Figure 3:
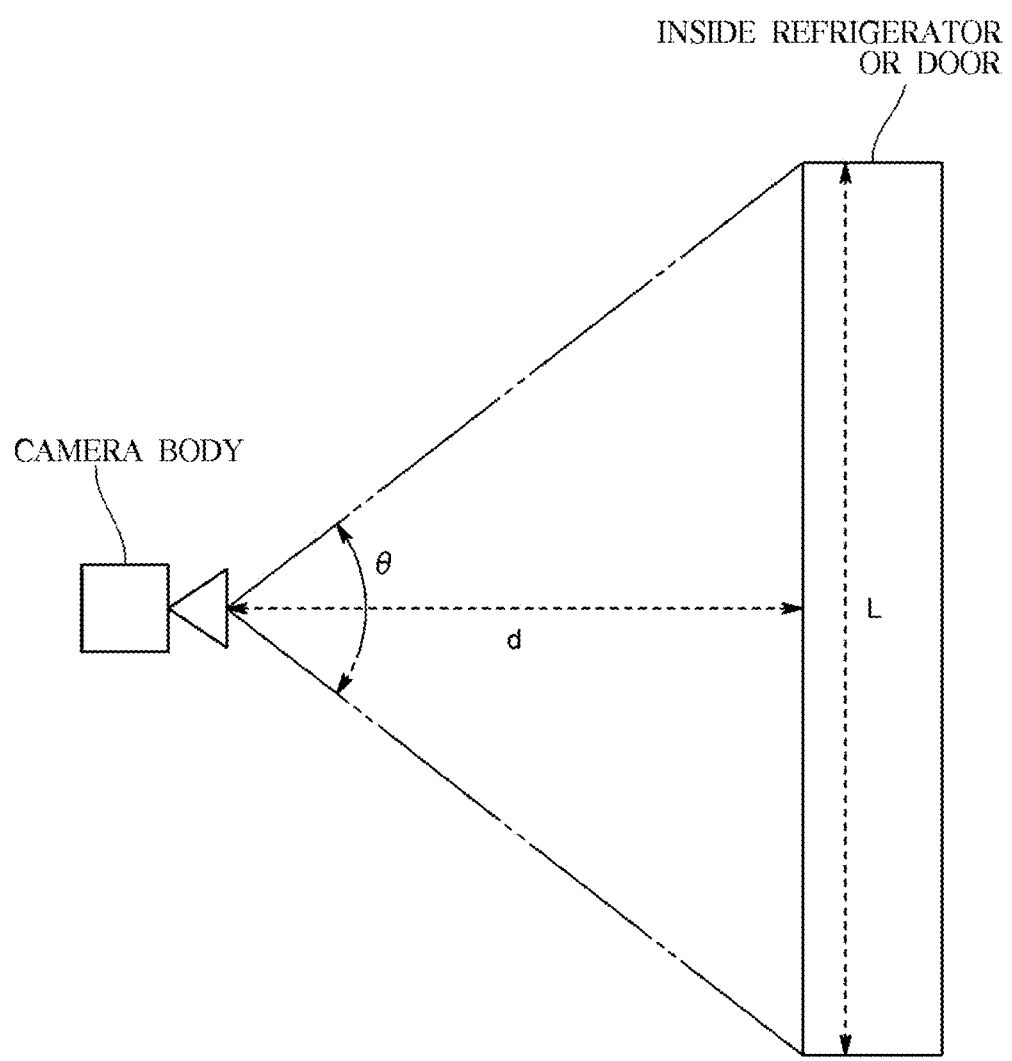
FIG. 3 is a view for explaining an angle of view of a camera body according to the first embodiment of the disclosure.

Here, an angle of view of the camera body described above will be described with reference to FIG. 3.

The relationship between an angle of view θθ of the camera body and a distance d between the camera body and a predetermined object surface to be photographed in the refrigerator or inside of the door D of the refrigerator is expressed by the following equation.

$$d=(L/2)/\tan(\theta\theta/2)$$

Here, L is the width of the inside of the refrigerator, the height of the inside of the refrigerator, the width of the door D, or the height of the door D.

Moreover, the object surface to be photographed set in the refrigerator is a surface including a front end of a plurality of shelves provided in the refrigerator and the object surface to be photographed set in the door D is a surface including a front end of a plurality of storage pockets provided in the door D, however, it may be set at a desired position as long as the object surface to be photographed is between the front surface of the refrigerator and the back surface or inside the refrigerator of the door D.

The distance d between the object surface to be photographed and the camera body set in the refrigerator or the door D changes depending on the degree of opening of the door D, herein, the distance d between the object surface to be photographed and the camera body set in the refrigerator or the door D is defined as the distance to the shortest state. Further, the distance d may be defined, for example, in a state in which the camera body is faced to each object surface to be photographed.

It is preferable that the angle of view of the camera body is set to be equal to or larger than the largest angle among the following angles θ01~θ04 calculated based on the above-described expression in order to make it possible to capture images stored in the refrigerator without fail.

$$d1=(L1/2)/\tan(\theta 01/2)$$

$$d1=(L2/2)/\tan(\theta 02/2)$$

$$d2=(L3/2)/\tan(\theta 03/2)$$

$$d2=(L4/2)/\tan(\theta 04/2)$$

Here, d1 is a distance between the object surface to be photographed set in the refrigerator and the camera body, d2 is a distance between the object surface to be photographed set in the door D and the camera body, L1 is a width of the inside of the refrigerator, L2 is a height of the inside of the refrigerator, L3 is a width of the door, and L4 is a height of the door.

In the present disclosure, since the plurality of photographing devices are provided in each door, the angle of view of the camera body is set so that at least a part of the respective object surfaces to be photographed with respect to each camera body overlaps with each other so that these respective object surfaces to be photographed include both inside the refrigerator or inside the refrigerator.

Next, the driving device 20 will be described.

Figure 4:
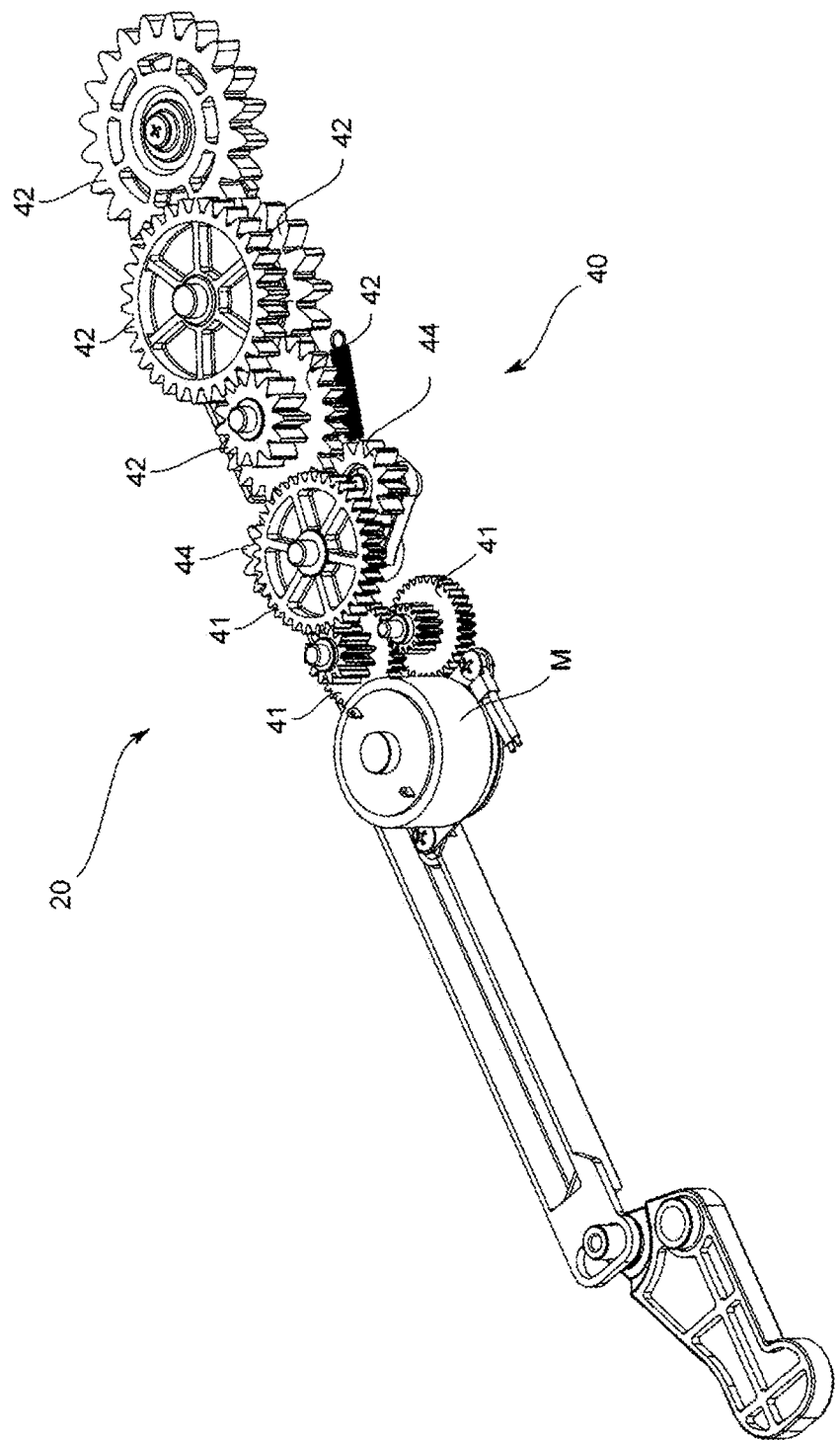
FIG. 4 is a view schematically illustrating a configuration of a drive mechanism of the first embodiment of the disclosure.
Figure 5:
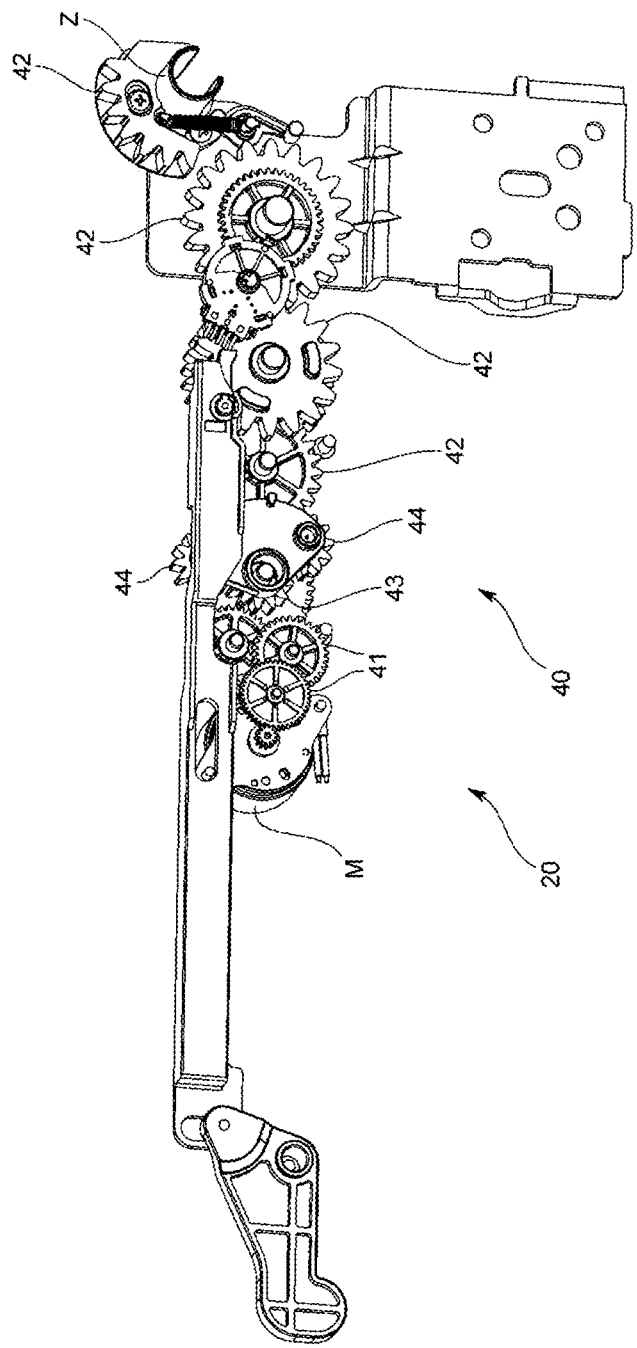
FIG. 5 is a view schematically illustrating a configuration of a driving device according to the first embodiment of the disclosure.

The driving device 20 outputs the power for opening and closing the door D and transmits this power to the door D, specifically as shown in FIGS. 4 and 5, and the driving device 20 has a motor M for receiving the drive signal from an information processing device 30 and rotating forward or reverse and a power transmission device 40 for transmitting the power of the motor M to the door D through the hinge axis Z. FIG. 4 is a plan view of the driving device 20 from above, and FIG. 5 is a plan view of the driving device 20 from below. Here, the motor M and the power transmission device 40 are accommodated in a casing C as shown in FIG. 1 so as to prevent the appearance from deteriorating.

The power transmission device 40 is disposed between the motor M and the hinge axis Z and has a plurality of gears that rotate in conjunction with the motor M as shown in FIG. 4.

Figure 6:
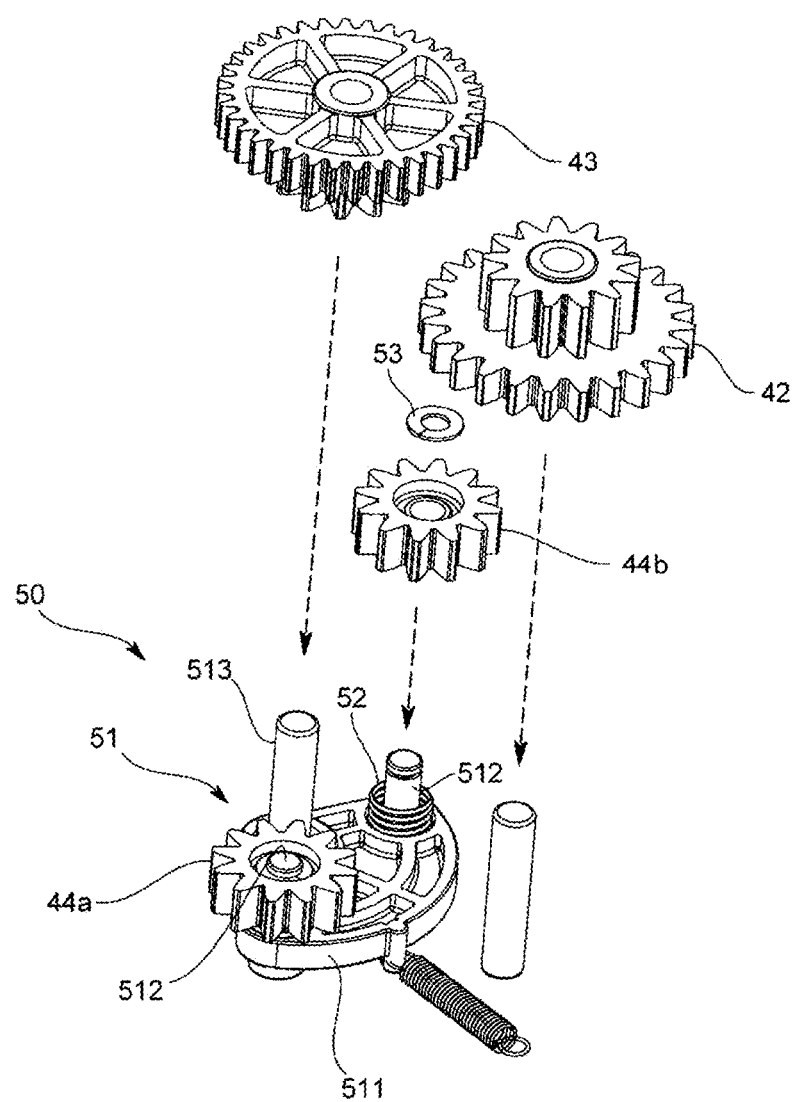
FIG. 6 is a view schematically illustrating a configuration of a moving device according to the first embodiment of the disclosure.

More specifically, as shown in FIGS. 4 to 6, the power transmission device 40 includes a motor-side gear 41 that rotates in conjunction with the motor M, a center gear 43 connected to the motor-side gear 41 and a pair of idler gears 44 meshing with the center gear 43. Hereinafter, the pair of the idler gears 44 is defined as one idler gear 44a and other flow gear 44b.

Figure 7A:
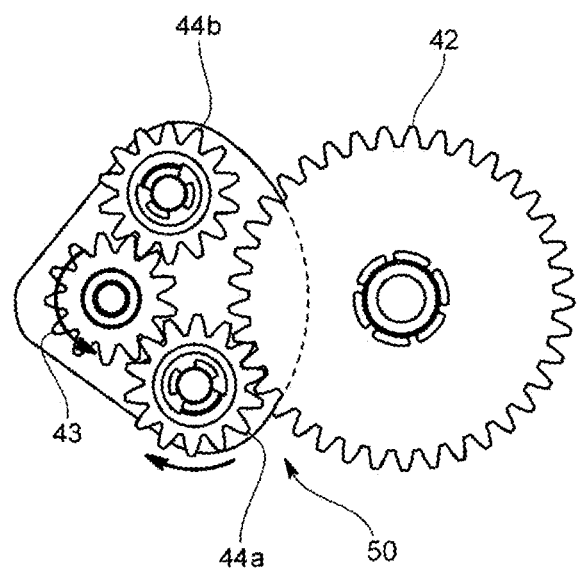
FIGS. 7a and 7b are views schematically illustrating an operation of the moving device according to the first embodiment of the disclosure.
Figure 7B:
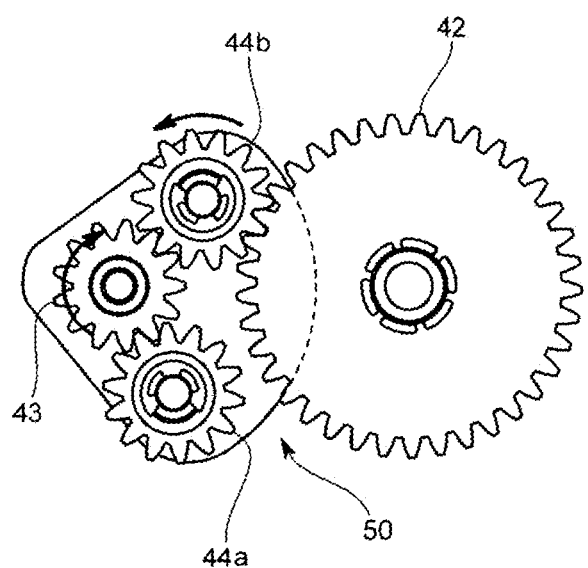
Figure 9A:
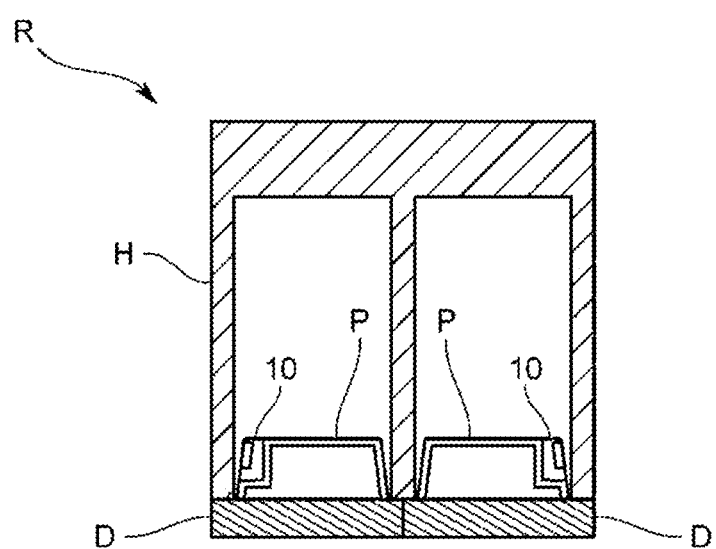
FIGS. 9a, 9b, 9c, and 9d are views schematically illustrating an operation of the refrigerator of the first embodiment of the disclosure.
Figure 9B:
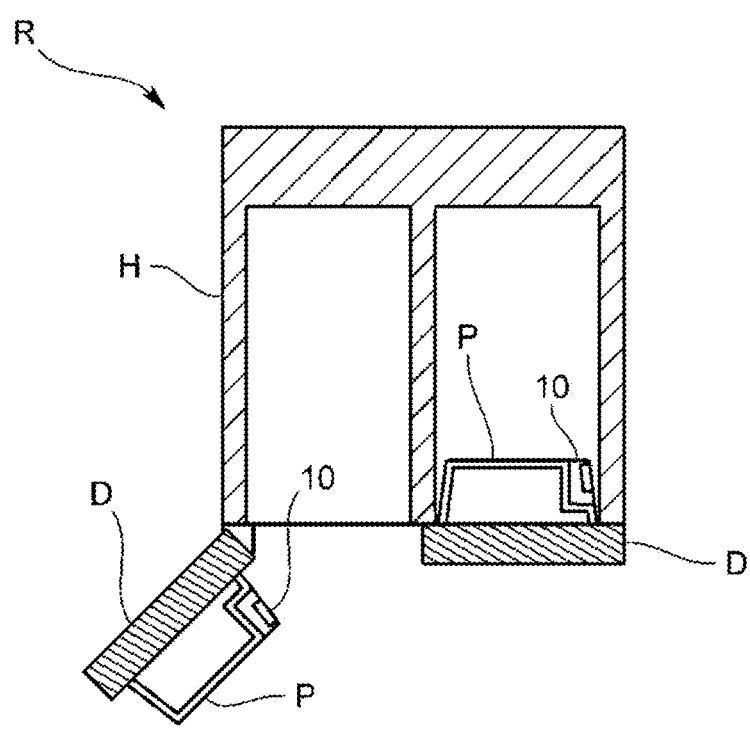
Figure 9C:
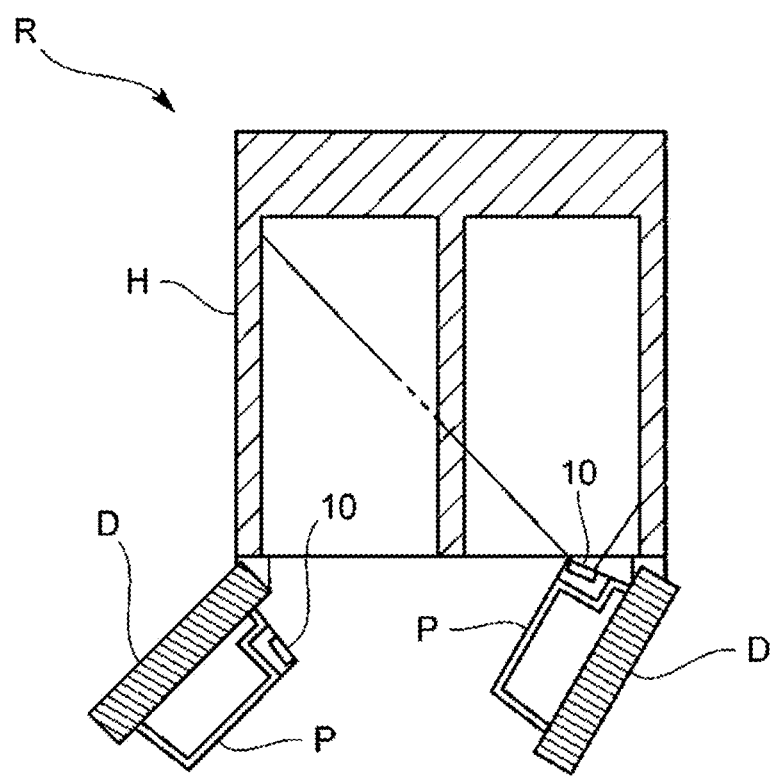
Figure 9D:
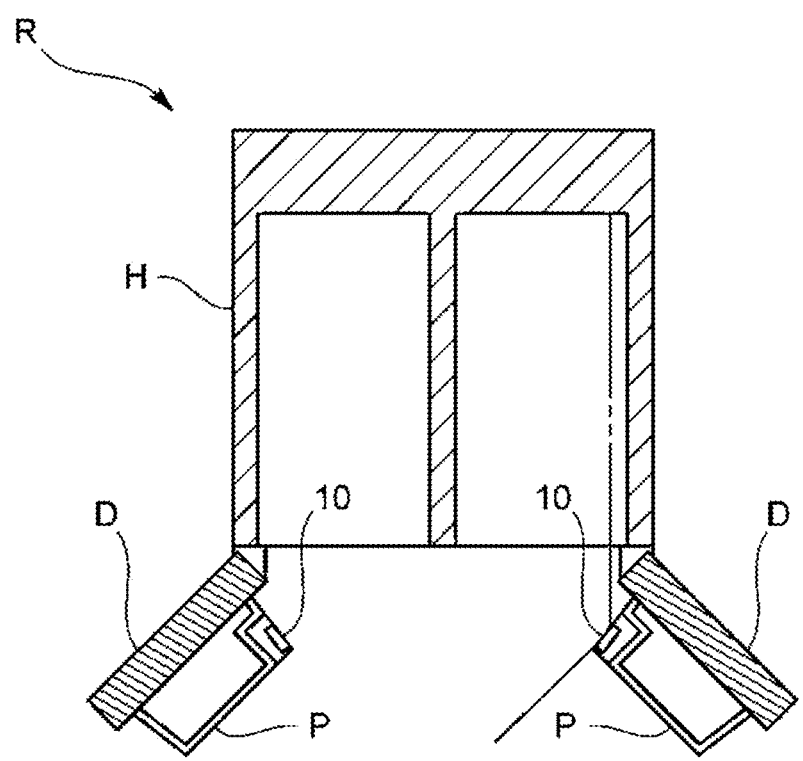
Figure 10A:
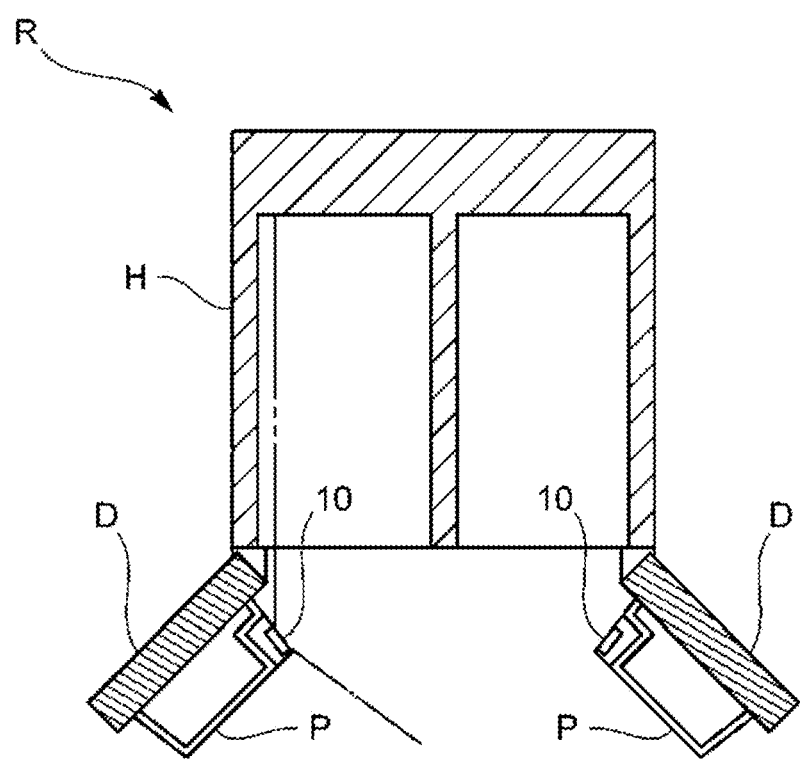
FIGS. 10a, 10b, 10c, and 10d are views schematically illustrating an operation of the refrigerator of the first embodiment of the disclosure.
Figure 10B:
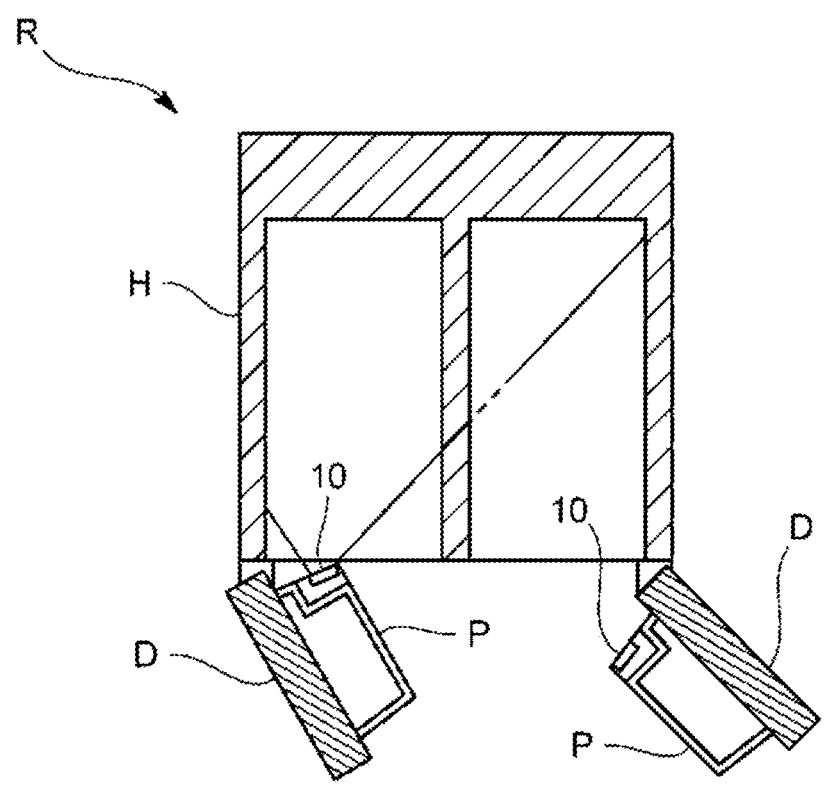
Figure 10C:
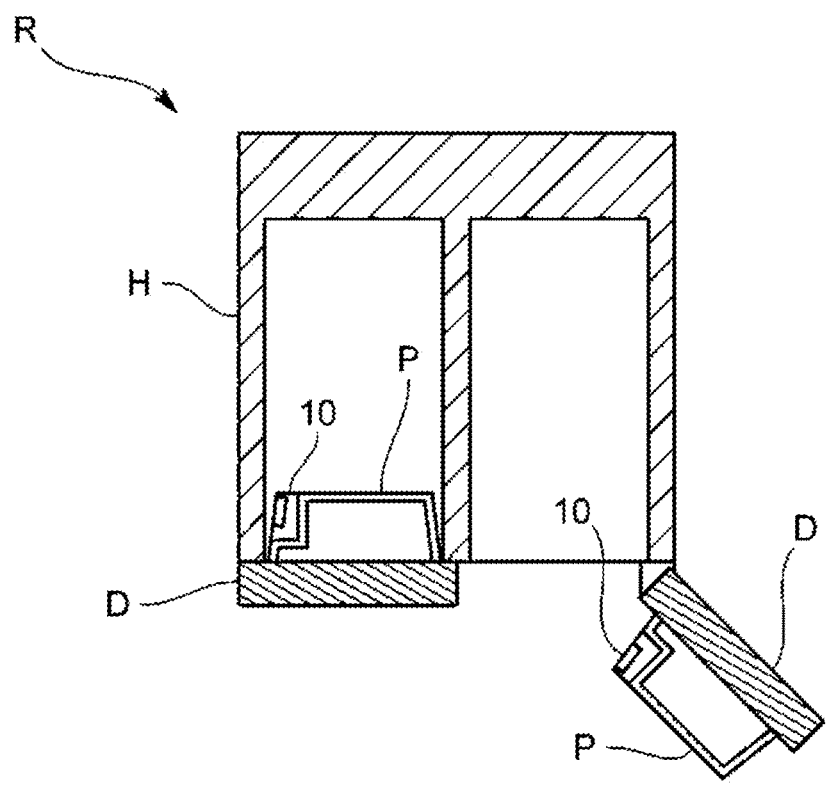
Figure 10D:
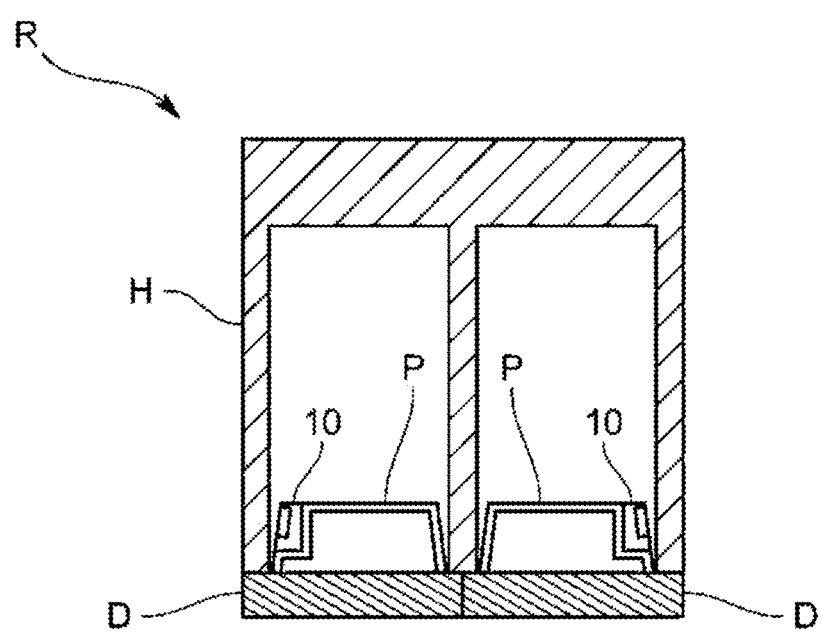

As shown in FIGS. 6 to 7b, the power transmission device 40 of the present embodiment has a swing device 50 for moving the pair of the idler gears 44 along a plane perpendicular to the rotation axis of the center gear 43 with the center gear 43 as the center by the rotation of the center gear 43.

The swing device 50 includes a mounting member 51 which rotates about the rotational axis of the center gear 43 and on which the idler gears 44a and 44b are mounted, and a rotation load member 52 for applying a load to the rotation of each of the idler gears 44.

The mounting member 51 is provided with a plate member 511 on which both the center gear 43 and the pair of the idler gears 44 are installed and a pair of mounting shafts of the pair of the idler gears 512 standing from the plate member 511 for mounting the idler gears 44 and a mounting shafts of the center gear 513 for mounting the center gear 43.

The rotation load member 52 generates a torque that applies a load to the rotation of the idler gears 44 and pivots the pair of the idler gears 44 about the rotational axis of the center gear 43, and is an elastic member such as a spring that passes through the mounting shaft of the pair of the idler gears 512 and applies an upward force along the rotating shaft to the idler gears 44.

In the present embodiment, as shown in FIG. 6, the rotation load member 52 is passed through the mounting shaft of the pair of the idler gears 512, the idler gears 44 is passed from above, and a pressure member 53 pressing the idler gears 44 downward is passed from above, so that the upward force is applied to the idler gears 44.

The swing device 50 is configured so that the pair of the idler gears 44 are arranged between a forward power transmission position such that one of the idler gears 44a is engaged with the door gear 42 (FIG. 7a) and a reverse power transmission position such that the other of the idler gears 44b is engaged with the door gear 42 (FIG. 7b).

With the above-described configuration, as shown in FIG. 7a, when the center gear 43 rotates in the forward direction being interlocking with the rotation of the motor M (here, in the counterclockwise direction as viewed from above), the pair of the idler gears 44 rotate in the counterclockwise direction about the rotation axis of the center gear 43 so that one of the idler gears 44a engages with the door gear 42. As a result, the driving device 20 of the present embodiment becomes an automatic opening mode in which the door D is automatically opened by the power of the motor M.

On the other hand, as shown in FIG. 7b, when the center gear 43 rotates in the reverse direction being interlocked with the rotation of the motor M (here, clockwise from above) the pair of the idler gears 44 rotate in the clockwise direction about the rotation axis of the center gear 43 so that the other of the idler gears 44b engages with the door gear 42. As a result, the driving device 20 of the present embodiment becomes an automatic closing mode in which the door D is automatically closed by the power of the motor M.

In the refrigerator R of the present embodiment, the above-described driving device 20 is configured to photograph the inside of the refrigerator with the door D opened.

More specifically, the refrigerator R of the present embodiment receives a command from the outside to control the driving device 20 and the photographing device 10, and also provided with the information processing device 30 for processing the information photographed by the photographing device 10.

The information processing device 30 is physically equipped with a CPU, a memory, an A/D converter, and the like built-in the door D or the case H, as shown in FIG. 8. CPU or the peripheral device cooperates with the CPU or the peripheral device according to the program stored in the predetermined area of the memory so that the information processing device 30 functions as a photographing command receiver 31, a driving device controller 32, a photographing device controller 33, a photographing data processor 34, a photographing data saver 35, and a photographing data transmission 36.

Hereinafter, the operation of the refrigerator R of the present embodiment will be described in the description of each of the configurations 31, 32, 33, 34, 35, and 36 of the information processing device 30.

First, the photographing command receiver 31 receives a photographing command by a user using an image display device such as an input device such as a touch panel provided in the refrigerator R or a portable device such as a mobile phone. The image display device may include a TV, a computer, a tablet PC, and the like. Hereinafter, a portable device will be described as an example.

When the photographing command receiver 31 receives the photographing command, the driving device controller 32 outputs a driving signal to control the driving device 20 to the automatic opening mode, and, as shown in FIGS. 9a to 9d, the driving device 20 first opens one of the left and right doors D to a predetermined angle.

Hereinafter, for convenience of explanation, one of the doors D is referred to as the left door D as viewed from the front.

Next, the driving device 20 opens the other door D of the right and left doors D, that is, the right door D to a predetermined angle.

At this time, the photographing device controller 33 outputs a photographing start signal to the photographing device 10 installed on the door D on the right side to photograph a continuous still picture or to shoot a video from the state in which the right door D is closed to when the right door D is opened with the predetermined angle. Thus, the photographing device 10 installed on the right door D may photograph at least the storage pockets P of the doors D on the right and left sides in the refrigerator.

Subsequently, the driving device 20 closes the left door D as shown in FIGS. 10a to 10d. At this time, the photographing device controller 33 outputs a photographing start signal to the photographing device 10 installed at the door D on the left side to photograph a continuous still picture or to shoot a video from the state in which the left door D is opened with the predetermined angle to when the left door D is closed. Thus, the photographing device 10 installed on the left door D may photograph at least the storage pockets P of the doors D and the left sides in the refrigerator.

The photographing device controller 33 of this embodiment outputs the photographing start signal to all of the photographing devices 10 installed in each of the doors D when photographing the inside of the refrigerator, and outputs the photographing start signal to the photographing device 10 located at the uppermost position of the door D on the opposite side of the storage pocket P when photographing the storage pocket P.

Figure 11:
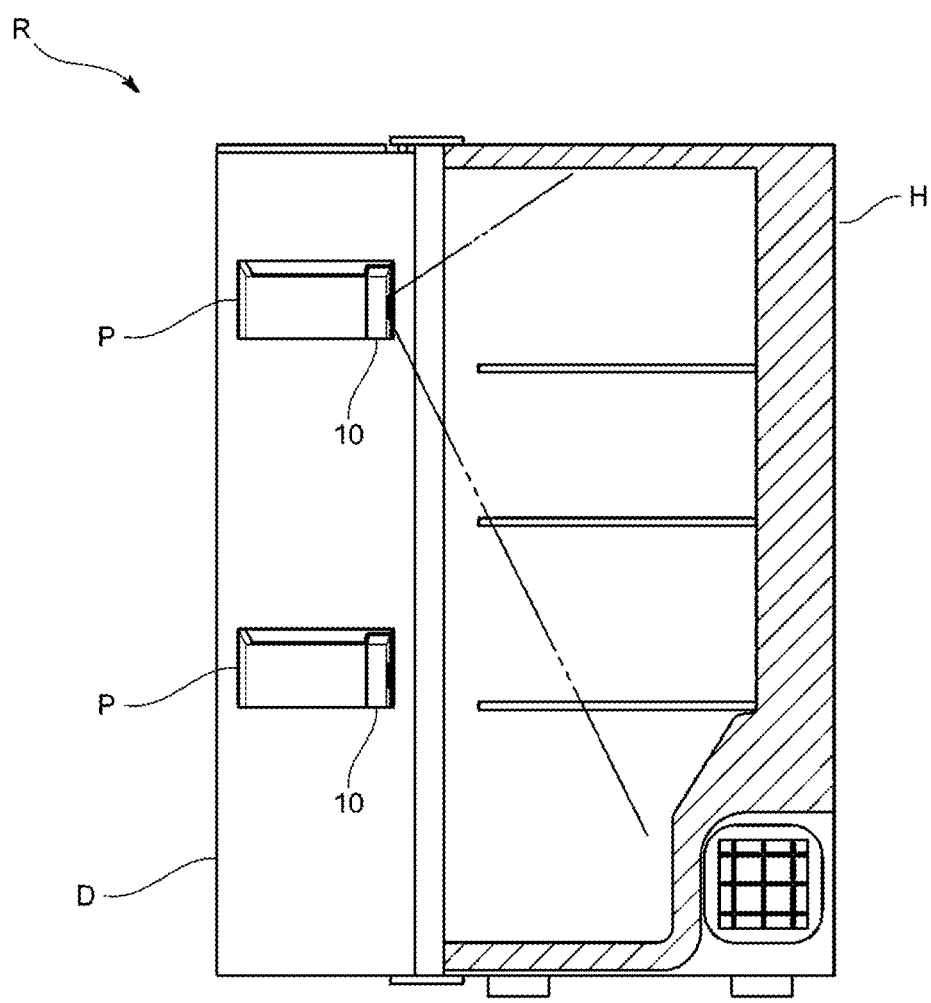
FIG. 11 is a view schematically illustrating a vertical viewing angle of a photographing device according to the first embodiment of the disclosure.

In the present embodiment, as shown in FIG. 11, the photographing device 10 positioned at the upper end has at least a vertical viewing angle capable of photographing the upper half of the refrigerator, and the photographing device 10 located at the lower end has at least a vertical viewing angle capable of photographing the lower half of the refrigerator. If the photographing device 10 has a vertical viewing angle in which the entire upper and lower portions of the refrigerator, for example, it is possible to photograph the inside of the refrigerator using one of the photographing devices 10 located at the center of the upper and lower portions.

The photographing device 10 of the present embodiment has a horizontal viewing angle in which at least the whole length of the storage pocket P in the left and right direction.

When the driving device 20 and the photographing device 10 cooperate to take photographs of the inside of the refrigerator and the storage pocket P, the photographing data processor 34 reads the photographing data from the photographing device 10, and acquires image data or moving image data.

The photographing data processor 34 may acquire the photographing data after the above-described process of photographing, or may sequentially acquire the photographing data during the above-described process of photographing.

The photographing data processor 34 selects an acquired optimal continuous still picture or an acquired optimal video (hereinafter referred to as an optimal photograph).

More specifically, for example, in the refrigerator or on the inside of the refrigerator in the door D, an area index (not shown) indicating a photographing target area to be photographed by the photographing device 10 is provided in advance, and the photographing data processor 34 selects the optimal photograph from the acquired continuous still picture or acquired video based on the area index.

The area index is provided at a predetermined position of the case H or the door D in accordance with the viewing angle of the photographing device 10, and is a plurality of markers provided at corner portions on the inner side of the refrigerator, and the like.

As a result, the photographing data processor 34 of the present embodiment easily (with a small throughput) selects an image including all of the area index or an image having the least deformation of each area index as the optimum photograph from the acquired continuous still image data or moving image data. The optimum photograph selection method may be changed as appropriate.

Figure 12:
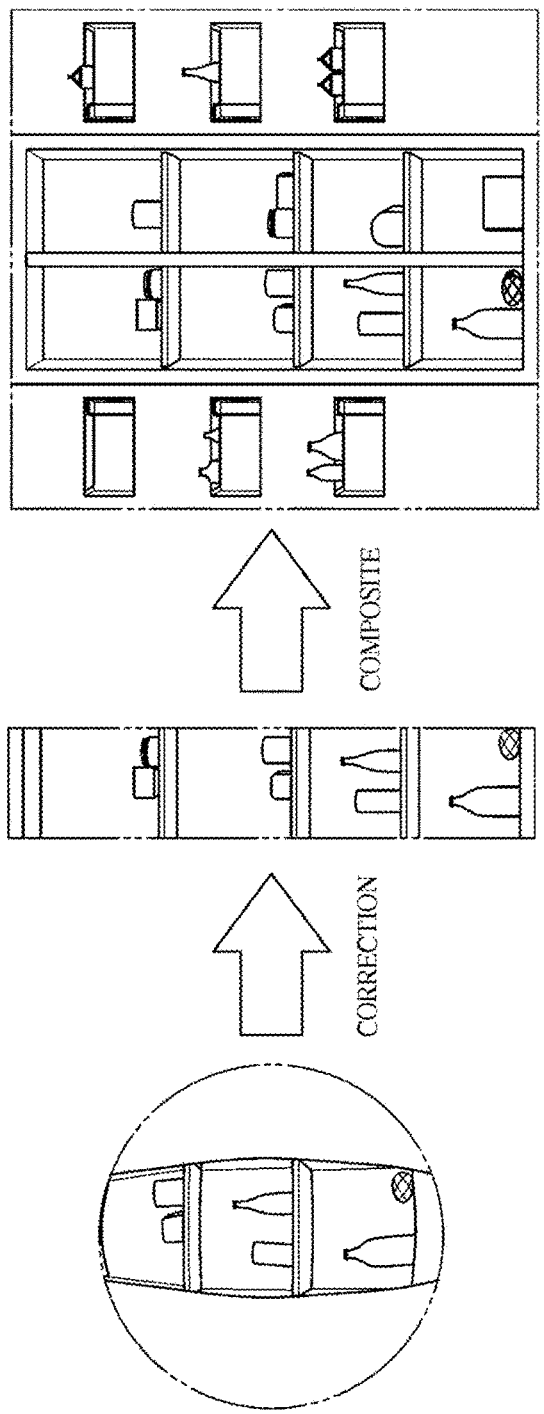
FIG. 12 is a view schematically illustrating processing of photographic data by the information processing device according to the first embodiment of the disclosure.

The photographing data processor 34 appropriately corrects the optimal photograph according to a correction algorithm previously stored in the memory. For example, in this embodiment, as shown in FIG. 12, the optimal photograph is configured to correcting or trimming from wide angle lens distortion correction, trapezoid correction, or trimming. For the optimal photograph in the refrigerator, for example, the object surface of the wide-angle lens distortion correction or the trapezoidal correction is set on the surface including the front end of the plurality of shelves provided in the refrigerator, and for the optimal photograph of the storage pocket P, the object surface of the wide-angle lens distortion correction or the trapezoidal correction is set to the surfaces including the front surfaces of the respective storage pockets P, so that the image of the stored object after correction may be corrected so as to similar to the outline from the user's point of view as much as possible. In addition, the surface to be corrected may appropriately change.

The photographing data processor 34 is configured to combine a plurality of optimal photographs.

As shown in FIG. 12, the photographing data processor 34 of the present embodiment composes the optimal photograph of the left side in the refrigerator and the optimal photograph of the storage pockets P of the right door D taken by the photographing device 10 on the left door D, and the optimal photograph on the right side in the refrigerator and the optimal photograph of the storage pockets P of the left door D taken by the photographing device 10 on the right door D.

As a result, a photograph in which the left and right doors D are opened is generated as a composite photograph.

The photographing data saver 35 is set in a predetermined area of the memory and stores the optimal photograph obtained by the photographing data processor 34. Further, in order to reduce the capacity of the memory, it doesn't matter that the optimal photograph stored in the photographing data saver 35 may be configured to be overwritten.

Figure 13:
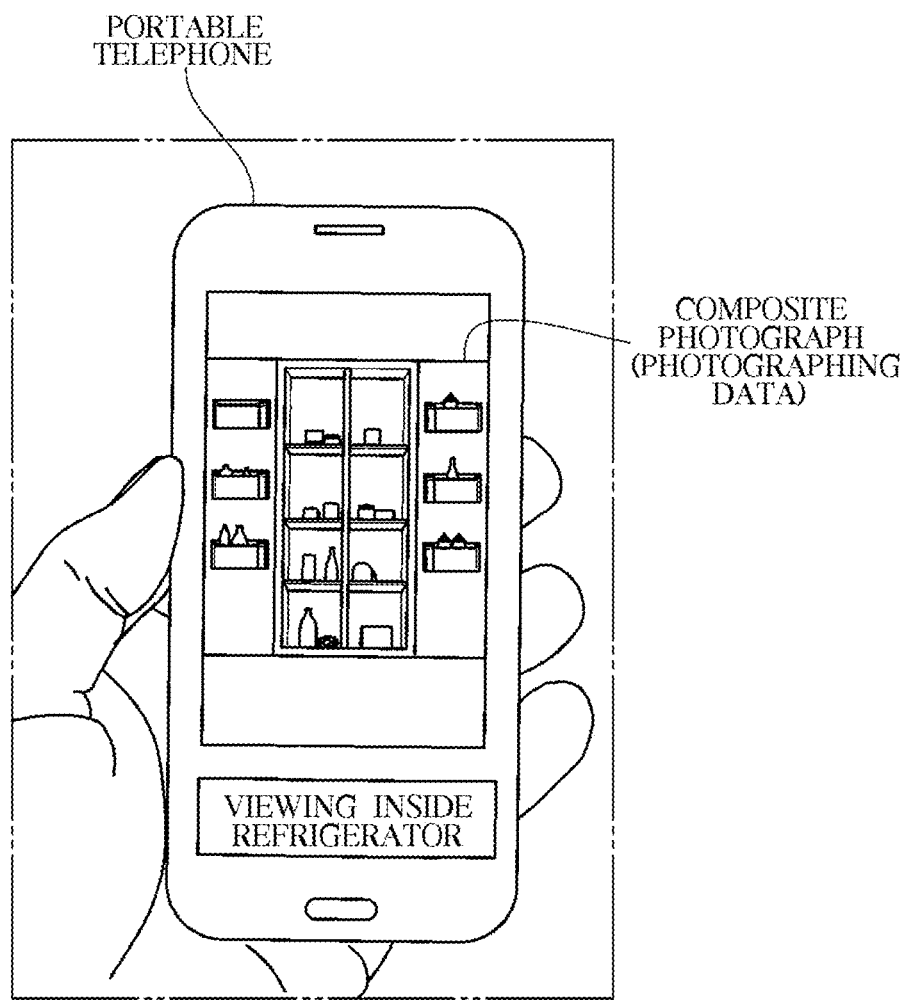
FIG. 13 is a view schematically illustrating an image transmitted by the information processing device according to the first embodiment of the disclosure.

As shown in FIG. 13, the photographing data transmission 36 transmits the above-described optimal photograph or the composite photograph of the plurality of optimal photographs to the portable device such as a user's portable telephone.

The photographing data transmission 36 of this embodiment is configured to transmit the optimal photograph or the composite photograph of the plurality of optimal photographs when the optimal photograph or the composite photograph of the plurality of optimal photographs is generated, however for example, the photographing data transmission 36 of this embodiment is configured to transmit the latest optimal photograph or the composite photograph of the plurality of optimal photographs stored in advance in the photographing data saver 35 when receiving a command from the user. Further, the latest optimal photograph or the composite photograph of the plurality of optimal photographs may be an image obtained when the door D is opened latest.

In the refrigerator R according to this embodiment configured as described above, since the photographing device 10 photographs the inside of the refrigerator while the door D is automatically opened by the driving device 20, a distance between the photographing device 10 and the refrigerator may be kept longer than the that of when the door D is closed. As a result, the photographing range is widened, so that even if the stored object is placed in front of the refrigerator, the stored object is within the entire photographing range, and other objects may be taken. As a result, the stored objects in the refrigerator may be clearly photographed, and the stored state in the refrigerator may be confirmed even in a remote place.

Since the storage pocket P of the door D is photographed by the driving device 20 with the door D automatically opened, even if the user is far from the refrigerator R, the storage pocket P may be photographed.

As a configuration for photographing the storage pocket even if the user is far away from the refrigerator, it is conceivable to adopt a configuration in which the photographing device is provided inside the refrigerator and the storage pocket is photographed by the photographing device in a state in which the door D is closed.

However, in the above-described configuration, when the distance between the photographing device and the storage pocket is relatively close, a large number of photographing devices are required to photograph all of the plurality of storage pockets installed at the upper and lower sides On the other hand, in the refrigerator R according to the present embodiment, since the storage pocket P of each of the doors D is photographed with the left and right doors D opened by the driving device 20, the plurality of storage pockets P may be photographed by the photographing device 10 which is smaller than the above-described configuration.

In addition, the information processing device 30 selects the optimal photograph from the continuous still picture or the video, and transmits the corrected or composed optimal photograph to the outside, so that user may easily check the storage state of the refrigerator R even in the place where the user goes out.

The user confirms an optimal photograph through the portable device or the like, and the user may additionally desire an image photographed at a different angle. At this time, the user may send a signal to the information processing device 30 through a portable device or the like to receive the photographed image at an angle different from the optimal photograph.

In detail, the user may send a photographing command signal from another angle to the information processing device 30 through the portable device. The photographing command receiver 31 of the information processing device 30 receives the additional photographing command sent by the user and may drive the driving device 20 through the driving device controller 32.

In order to obtain the optimal photograph, the driving device 20 opens the door D at the predetermined angle, and the driving device controller 32 may rotate the door D at an angle larger or smaller than the predetermined angle for photographing at a different angle.

Thereafter, the photographing device controller 33 drives the photographing device 10 so that the photographing device 10 may photograph the inside of the refrigerator or the storage pocket P of the door D at the predetermined angle.

The image photographed at an angle outside the predetermined angle may be transmitted to the portable device or the like of the user again through the same process as described above, and the user may confirm the optimal photograph outside the portable device or the like.

In addition, the information processing device 30 allows the user to specify the angle desired by the user, rather than a predetermined angle, to allow the driving device 20 to open the door D at an angle desired by the user, and the photographing device 10 may be provided so as to photograph the storage pocket P in the refrigerator or the door D at the opening angle of the door D desired by the user.

That is, the user may input the opening angle of the door D desired by the user to the portable device or the like, and the input signal may be received by the photographing command receiver 31 of the information processing device 30.

Thereafter, the driving device controller 32 may drive the driving device 20 to open the door D by the angle designated by the user and the photographing device controller 33 may control the opening and closing of the door D, and the photographing device 10 may be driven to obtain the photograph at the angle designated by the user.

The photographed image at the angle designated by the user may be transmitted to the portable device or the like of the user again through the same process as described above and the user may confirm the photograph that is not the optimal photograph through the portable terminal or the like.

Second Embodiment

Hereinafter, a second embodiment of the refrigerator according to the present invention will be described with reference to the drawings.

Figure 14:
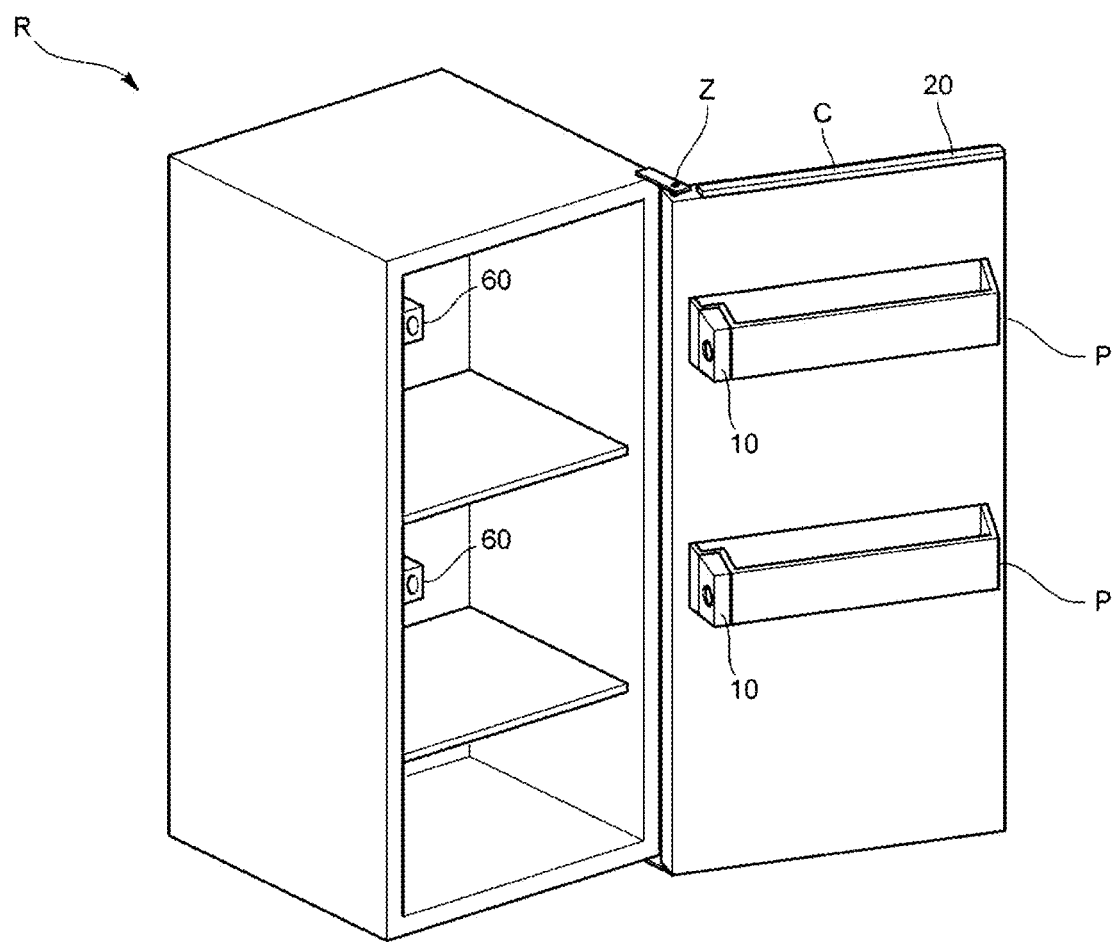
FIG. 14 is a view schematically illustrating a configuration of a refrigerator according to a second embodiment of the disclosure.
Figure 15A:
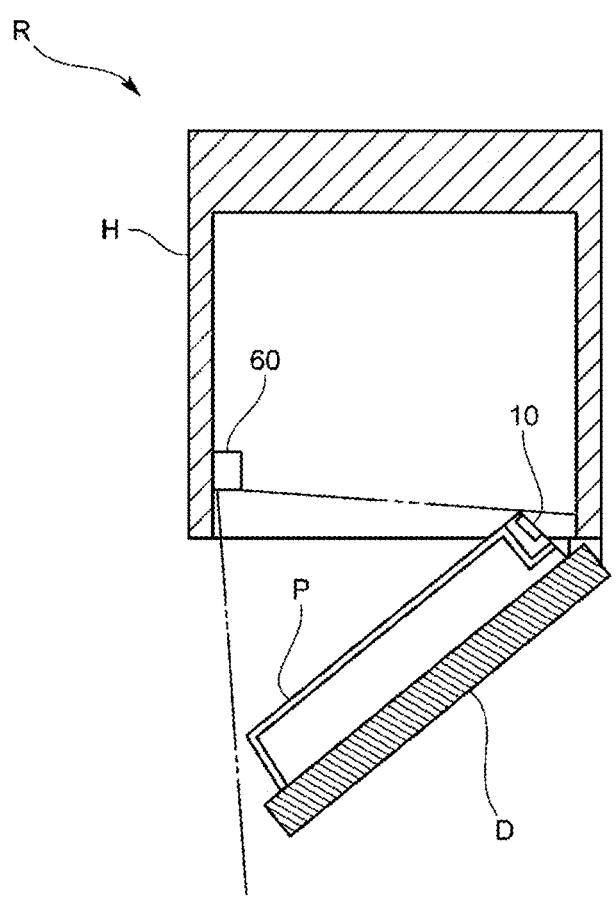
FIGS. 15a and 15b are views schematically illustrating an operation of the refrigerator according to the second embodiment of the disclosure.
Figure 15B:
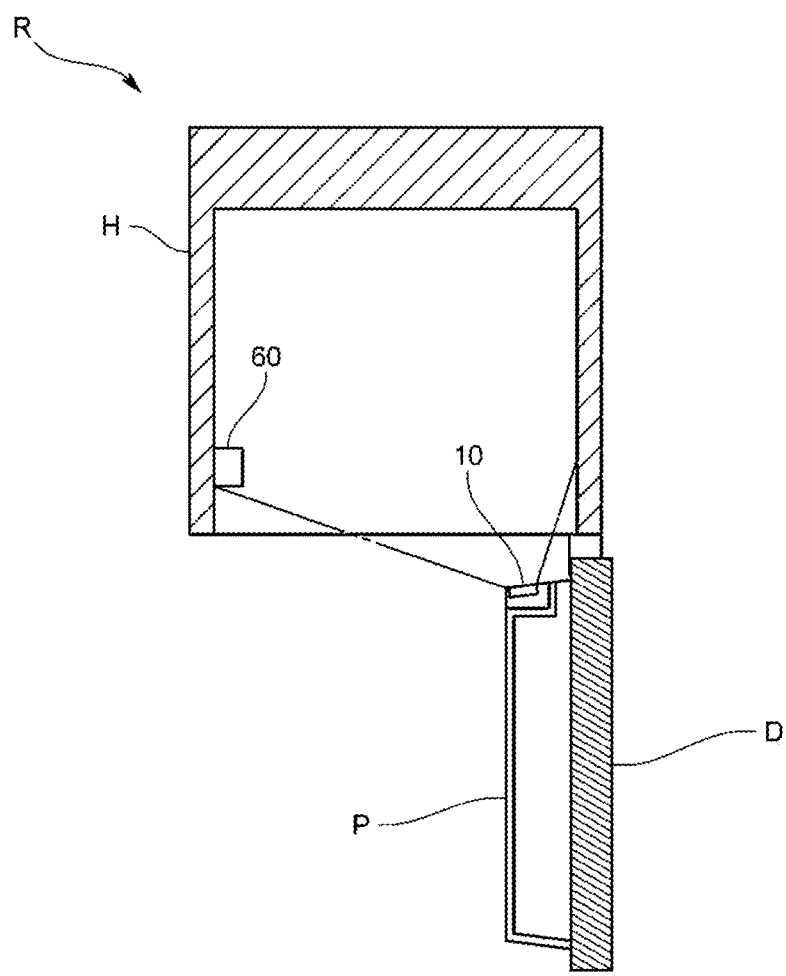

As shown in FIG. 14, a refrigerator R according to the present embodiment includes a refrigerator main body H (hereinafter, also referred to as a case H) having a front face opened and at least one door D provided at the opening of the case H, and each of the doors D is rotatably supported on a hinge axis of a hinge Z that is so-called one-door refrigerator.

As shown in FIG. 14, the refrigerator R is provided with a photographing device 10 installed inside the refrigerator of the door D and a driving device 20 installed at the top of the door D for automatically opening and closing the door D. The photographing device 10 and the driving device 20 are the same as those in the first embodiment, and a description thereof will be omitted.

The refrigerator R of the present embodiment further includes a second photographing device 60 installed in the refrigerator and the driving device 20 opens the door D so that the second photographing device 60 is configured to photograph a storage pocket P of the door D.

The second photographing device 60 is provided on the side (handle side) opposite to the hinge Z of the door D in the refrigerator. The specific configuration is the same as that of the photographing device 10 described above.

Hereinafter, the operation of the refrigerator R of the present embodiment will be described with reference to FIGS. 15a to 15d.

First, the second photographing device 60 photographs the storage pocket P while the driving device 20 opens the door D in a closed state to a first predetermined angle.

Next, the photographing device 10 photographs the inside of the refrigerator while the driving device 20 further opens the door D at the first predetermined angle and moves it to a second predetermined angle.

Then, the driving device 20 closes the door D.

According to the refrigerator R of this embodiment configured as described above, the photographing device 10 photographs the inside of the refrigerator in a state in which the door D is automatically opened by the driving device 20 as in the first embodiment, and the second photographing device 60 is installed in the refrigerator, so that the storage pocket P may be photographed by the second photographing device 60 even the refrigerator R is one-door refrigerator.

Also, the present invention is not limited to the above-described embodiments.

Figure 16:
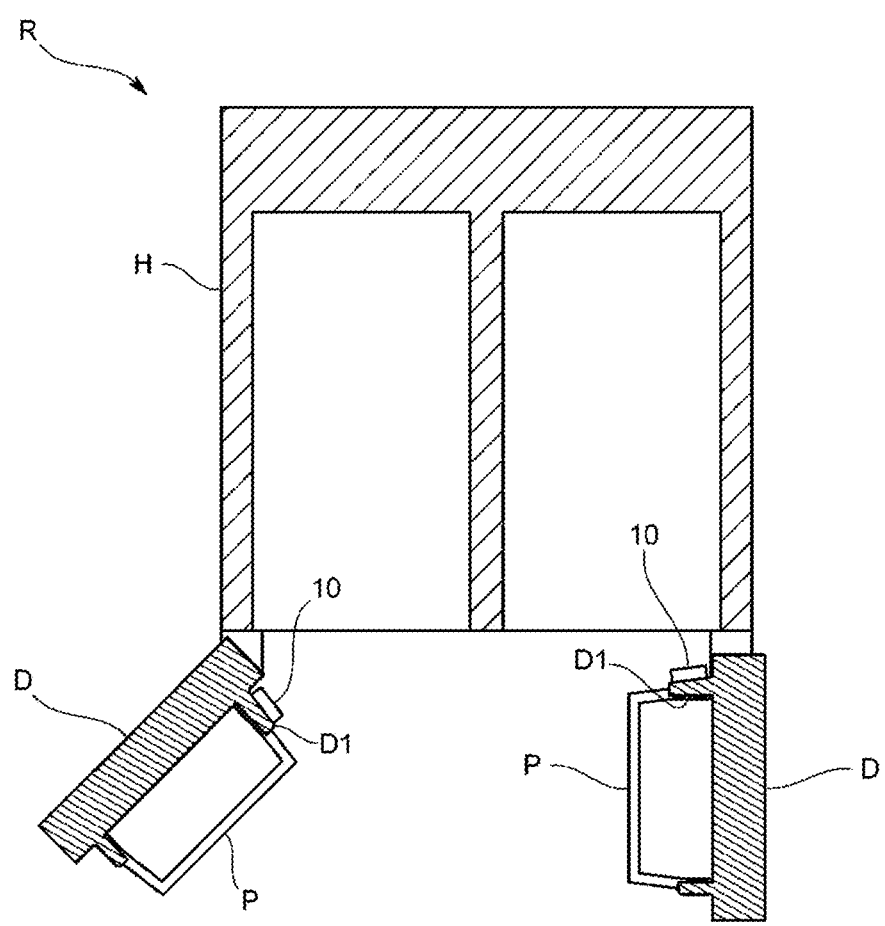
FIG. 16 is a view schematically illustrating a configuration of a refrigerator according to another embodiment of the disclosure.

The photographing device 10 is provided in the storage pocket P in each of the above embodiments, as shown in FIG. 16, and the photographing device 10 may be provided on the side of the hinge Z in a throat section D1 in which the storage pocket P is mounted.

Although the photographing device 10 of the above-described embodiment is configured to photograph a moving image, it may be configured to continuously photograph a plurality of images.

Also in the first embodiment, when the inside of the refrigerator and the storage pocket P are photographed by the photographing device 10, one of the doors D is opened and then the other door D is opened, however, the inside of the refrigerator and the storage pocket P may be photographed by the photographing device 10 installed in each of the doors D while simultaneously opening the doors D.

Further, in a refrigerator having a relatively small height called a French door type, it is judged from a viewing angle (θθ) of the camera and a distance d between the camera body and the object surface body calculated on the basis of the relational expression described in the first embodiment, so that the number of photographing apparatuses installed on the door may be one.

In addition, some or all of configurations 31, 32, 33, 34, 35, and 36 of the information processing device 30 of the first embodiment may be provided in a system, for example a server, located outside the refrigerator, and a management system for the refrigerator may be established by using the system and the refrigerator R.

In addition, some or all of the configurations 31, 32, 33, 34, 35, and 36 of the information processing device 30 of the first embodiment may be provided in a portable device, and the management system for the refrigerator may be established by using the portable device and the refrigerator R.

Moreover, some or all of the configurations 31, 32, 33, 34, 35, and 36 of the information processing device 30 of the first embodiment may be provided in the portable device and the system, and the management system for the refrigerator may be established by using the system, the portable device, and the refrigerator R.

The information processing device includes, for example, a display portion for displaying a photograph on a display mounted on the refrigerator or a user's portable telephone, and the display portion is configured to display a link or the like to be connected to delivery services automatically.

With such a configuration, the user may confirm a deficient object while viewing the photograph, smoothly purchase the deficient object, and assist the user in managing the inventory.

The information processing device may be configured so as to recognize a stored object by using the image recognition process from the photographed image.

Further, when the information processing device recognizes that it is stored and, for example, if the number of items previously selected is less than the required number, the information processing device automatically orders the required object from the delivery services or the like through a communication line such as a telephone line or the Internet.

Further, an ordering company, for example the delivery services, may be selected from a plurality of ordering companies previously authorized by the user, or may be limited to one ordering company designated by the user.

In the case where the deficient object is automatically ordered, the information processing device may automatically select the ordering company of the lowest ordering order or the shortest delivery date out of the plurality of ordering companies, or may select the ordering company based on the priority set in advance by the user.

When the deficient object is recognized, the information processing device notifies the user of the deficient object by e-mail, message, voice, video, etc. through the display mounted on the refrigerator or the cellular phone, and it is also possible to automatically order the deficient object.

The above-described various functions are not limited to the configuration in which the information processing device mounted in the refrigerator is used, and some or all of the functions may be connected to a remote server connected to the information processing device via a communication network such as the Internet, or it may be provided on the cell phone.

It is needless to say that the present invention is not limited to the above embodiments, and that various modifications are possible without departing from the spirit of the present invention.

The invention claimed is:

1. A refrigerator comprising:
    a housing including a storage chamber, the storage chamber including at least one side wall and a rear wall;
    a door configured to open and close the storage chamber and including:
        an inside facing the storage chamber,
        a throat portion protruding outward from the inside of the door, and
        a storage pocket mounted to the throat portion on the inside of the door;
    a hinge rotatably coupling the door to the housing;
    a driver including at least one motor for automatically opening and closing the door;
    a camera casing disposed on a side of the throat portion; and
    a camera disposed inside the camera casing and facing in a direction opposite to the side of the throat portion, wherein the side is adjacent to the hinge such that an optical axis of the camera is directed to the at least one side wall of the storage chamber when the door is in a closed position, the camera configured to photograph the storage chamber when the door is opened to a predetermined angle greater than 90 degrees by the driver.

2. The refrigerator of claim 1, wherein:
    the door includes a first door and a second door laterally provided with respect to the storage chamber,
    the camera includes a first camera disposed on the first door and a second camera disposed on the second door, and
    the first camera is configured to photograph an inside of the second door when the second door is opened by the driver.

3. The refrigerator of claim 1, wherein:
    the door includes a first door and a second door laterally provided with respect to the storage chamber,
    the camera includes a first camera disposed on the first door and a second camera disposed on the second door, and
    the first camera is configured to photograph the storage chamber when the first door is opened by the driver.

4. The refrigerator of claim 1, wherein:
    the door includes a first door and a second door laterally provided with respect to the storage chamber,
    the camera includes a first camera disposed on the first door and a second camera disposed on the second door, and
    the first camera is configured to photograph at least one of an inside of the second door and the storage chamber when the first door and the second door are opened by the driver.

5. The refrigerator of claim 2, wherein:
    the driver is provided to open the first door after opening the second door, and
    the first camera is configured to photograph the inside of the second door at a first position where the first door is opened and positioned by the driver.

6. The refrigerator of claim 5, wherein:
    the driver is provided to dispose the first door at a second position located between a closed position where the first door closes the storage chamber and the first position, and
    the first camera is configured to photograph the storage chamber when the first door is positioned in the second position.

7. The refrigerator of claim 6, wherein:
    the driver is provided to dispose the second door at a third position in which the second door is opened, and
    the second camera is configured to photograph the inside of the first door when the second door is disposed in the third position and when the first door is disposed adjacent to the first position.

8. The refrigerator of claim 7, wherein:
    the driver is provided to dispose the second door at a fourth position located between the closed position where the second door closes the storage chamber and the third position, and
    the second camera is configured to photograph the storage chamber when the second door is placed in the fourth position.

9. The refrigerator of claim 8, further comprising a processor configured to receive information photographed by the camera,
    wherein the processor combines pieces of information respectively photographed by the first camera when the first door is disposed in the first position and when the first door is disposed in the second position, and pieces of information respectively photographed by the second camera when the second door is disposed in the third position and when the second door is disposed in the fourth position, to form one image.

10. The refrigerator of claim 1, further comprising a processor configured to receive information photographed by the camera during opening and closing of the door,
    wherein the processor selects optimal information corresponding to the storage chamber or the inside of the door among pieces of photographed information, and transmits at least one of the information and the optimal information to an outside of the refrigerator.

11. The refrigerator of claim 10, wherein:
    the processor includes:
        a receiver configured to receive an external signal,
        a driver controller configured to control the driver based on a signal input from the receiver, and
        a camera controller configured to control the camera based on the signal input from the receiver,
    after the camera is driven at a first position, the driver controller further opens or closes the door so that the camera is disposed at a second position by the external signal received by the receiver, and
    the camera controller drives the camera when the camera is disposed at the second position.

12. The refrigerator of claim 1, further comprising a second camera disposed on the housing,
    wherein the second camera is configured to photograph the inside of the door when the door is opened by the driver.

13. The refrigerator of claim 12, wherein the camera is configured to photograph the storage chamber when the door is opened by the driver.

14. The refrigerator of claim 12, wherein the second camera is disposed on an opposite side of the hinge.

* * * * *